Patented Aug. 17, 1948

2,447,410

UNITED STATES PATENT OFFICE 2,447,410

PYROLYSIS OF CARBON CHLORIDES

Clifford Allen Hampel, Niagara Falls, N. Y., assignor to Mathieson Chemical Corporation, a corporation of Virginia No Drawing. Application June 24, 1942,
Serial No. 448,317

9 Claims. (Cl. 260—654)

This invention relates to an improved process for the manufacture of chlorinated compounds. One aspect of the invention relates more particularly to the manufacture of olefinic carbon chlorides such as tetrachloroethylene by the pyrolysis of carbon chlorides and particularly paraffinic carbon chlorides such as hexachloroethane. A second aspect of the invention relates more particularly to the manufacture of alkyl chlorides.

The invention contemplates the concurrent manufacture of the olefinic carbon chlorides and alkyl chlorides. It also contemplates an operation in which alkyl chloride is the primary product.

In its broader aspect the invention relates to the pyrolysis of carbon chlorides in the decomposition of which a mixture containing free chlorine is formed which, upon cooling of the mixture, recombines with the other constituent or constituents of the mixture either by the reverse reaction to form the original material or to form other undesired products.

It will be understood that the term "carbon chloride" is used herein to designate a binary compound of carbon and chlorine only, i. e. one containing no hydrogen.

It has previously been known, for instance, that tetrachloroethylene may be produced by the thermal decomposition of hexachloroethane. This decomposition consists in the splitting off of chlorine and results in an admixture of chlorine gas and tetrachloroethylene vapors. On cooling the admixed reaction products sufficiently to condense the tetrachloroethylene, there occurs a considerable recombining of the chlorine with the tetrachloroethylene to form the starting material, hexachloroethane. In other words, the decomposition reaction is reversible and proceeds in either direction as indicated by the following Equation 1 depending upon temperature conditions:

(1) 

Accordingly, quite independent of the extent of this decomposition reaction effected by the pyrolysis, the material obtained upon cooling the admixed products of the decomposition contains, in addition to the desired product and various possible by-products, a considerable proportion of the starting material re-formed by the reverse reaction upon the lowering of the temperature.

Such operations result not only in a low yield of the tetrachloroethylene but also in a mixed product from which the tetrachloroethylene is difficultly separable. The by-product chlorine which has not entered into the reverse reaction is readily soluble as such in the liquid reaction mixture at ordinary temperatures, and its presence requires an additional purification step in the recovery of the desired product. Also, chlorine split off from the hexachloroethane may react with the tetrachloroethylene to form carbon tetrachloride, according to Equation 2

(2) $C_2Cl_4 + 2Cl_2 \rightarrow 2CCl_4$ which not only reduces the yield of the desired product but also contaminates the tetrachloroethylene obtained.

It is an object of the present invention to provide a process for the manufacture of tetrachloroethylene or the like which is free from the above-noted difficulties. A further object of the invention is to provide a safe and effective process for the production of alkyl chlorides.

In accordance with my improved process, these and other advantages are attained, as will appear from the following detailed description thereof, by effecting the pyrolysis in the presence of hydrocarbons of the paraffin series, preferably of low molecular weight, which react with the liberated chlorine to form alkyl chloride or chlorides under the operating conditions. Since the chlorine set free by the formation of the tetrachloroethylene, for example, is substantially consumed by its reaction with the paraffin hydrocarbon, little or no free chlorine is available in the reaction mixture to recombine with the tetrachloroethylene upon cooling. By the selection of paraffin hydrocarbon which upon chlorination results in alkyl chloride having a boiling point or boiling range distinctly different from that of the tetrachloroethylene, the alkyl chloride or chlorides formed is readily separable from the tetrachloroethylene and constitute valuable products or by-products of the process.

The reaction by which these alkyl chlorides are formed in my process when ethane is used may be illustrated by the following Equation 3:

(3) $C_2H_6 + Cl_2 \rightarrow C_2H_5Cl + HCl$ and the overall reaction where hexachloroethane and ethane are charged to the process may be illustrated by the following Equation 4 which is obtained by combining the foregoing Equations 1 and 3:

(4) $C_2Cl_6 + C_2H_6 \rightarrow C_2Cl_4 + C_2H_5Cl + HCl$

The hexachloroethane may be obtained from any convenient source. It is not essential that it be of high purity. Preferably it should be free from materials of similar or greater volatility but it may contain considerable quantities of relatively non-volatile impurities without particular disadvantage.

The paraffin hydrocarbon or hydrocarbon mixture preferably should contain no substantial proportion of hydrocarbons of more than four carbon atoms per molecule, so that the alkyl chloride formed therefrom may be readily separated from the tetrachloroethylene by fractional condensation or distillation. Methane, ethane, propane and butane have been found particularly advantageous. These hydrocarbons may be used as relatively pure compounds or mixtures thereof in various proportions may be used. Higher paraffin hydrocarbons may be used under some conditions but for most satisfactory operations the paraffin hydrocarbons should be such that the alkyl chloride or chlorides derived therefrom will be readily separable from the tetrachloroethylene by conventional fractional distillation or condensation.

The proportion of the paraffin hydrocarbon or hydrocarbons to the hexachloroethane or the like used in my process may be varied somewhat but it is advantageous to use at least one mole of the paraffin hydrocarbon for each mole of hexachloroethane. A molar ratio equal to unity or greater encourages the formation of mono-halogenation alkyl products which are in general more readily separable from tetrachloroethylene than are the di-halogenation alkyl products or more high halogenated compound. However, when it is desirable more highly to chlorinate the paraffin hydrocarbon, a lower molar ratio may be used with advantage and, where the volatility of the resulting halogenated compound is substantially different from that of the tetrachloroethylene or the like, no particular difficulty is experienced in effecting their separation. For instance, methylene chloride, which is formed when methane is used in the process in proportions lower than the 1:1 molar ratio, is readily separable from the tetrachloroethylene by fractional distillation or condensation.

The paraffin hydrocarbons may, if desired, be used in proportions considerably in excess of a molar ratio of 1:1. They are substantially inert with respect to undissociated hexachloroethane and react to a substantial extent only with the chlorine liberated by the decomposition of the hexachloroethane or the like. Any excess of paraffin hydrocarbon over that required to react with the liberated chlorine may be separated from the reaction products and recycled to the process. The yield of tetrachloroethylene is not adversely affected by the use of the paraffin hydrocarbons in excess of the amount required to react with liberated chlorine.

The process, as applied to the pyrolysis of hexachloroethane, may be effected by passing an admixture of hexachloroethane and low boiling paraffin hydrocarbon in suitable proportions through a reaction zone wherein the mixture is heated to a temperature at least as high as the temperature at which hexachloroethane decomposes to form tetrachloroethylene. At such temperature the liberated chlorine will react with the paraffin hydrocarbon present to form alkyl chloride. The admixed products of the reactions are passed from the reaction zone to a separating operation, for instance fractional condensation by cooling.

The admixture of the hexachloroethane and the paraffin hydrocarbon passed to the reaction zone may be prepared in any suitable manner and, if desired, these charge materials may be preheated either before or after mixing. One method of forming the mixture which I have used with advantage is to preheat the hydrocarbon and thereafter pass it through a mass of heated hexachloroethane. The hexachloroethane of the mass, which may be either in the liquid or the solid state, is thus picked up by the preheated hydrocarbons and carried thereby to the reaction zone. The proportion of hydrocarbon used is not critical and when the production of mono-halogenated paraffin is desired, it is necessary only to provide that the molar ratio of the paraffin hydrocarbon to the hexachloroethane be at least equal to unity. When higher halogenated paraffins are desired, it is necessary to exercise greater care to keep the hydrocarbon ratio at a lower value.

The reaction zone may consist of a chamber adapted to be heated to the desired temperature, for instance a quartz tube situated in a furnace. Such tube is with advantage provided internally with increased heat-exchange surfaces, for instance it may be packed with broken bits of glass, porcelain or other inert material. However, a simple tube will suffice providing it is long enough or the flow throughout is slow enough to afford sufficient, uniform heating. No catalyst is required.

The hot reaction products passing from the reaction zone are cooled, for example by heat exchange with incoming paraffin hydrocarbons, and thereafter fractionally condensed to recover the tetrachloroethylene from the lower boiling alkyl chlorides and hydrogen chloride and any unreacted materials present. The uncondensed gases and vapors from the initial partial condensation may be subjected to further condensation for the recovery of the alkyl chlorides therefrom. If desired, the tetrachloroethylene and the alkyl chlorides may be condensed together and subsequently separated by fractional distillation. Any excess hydrocarbon present in the reaction products may be recycled to the reaction zone after being freed from hydrogen chloride.

In passing through the reaction zone the admixed reactants should be heated to a temperature sufficiently high to effect substantially complete dissociation of the carbon chloride charging material. In the pyrolysis of hexachloroethane, for example, a temperature of about 300° C. to 500° C. may be used with advantage. Temperatures in excess of about 500° C. are usually undesirable in the pyrolysis of hexachloroethane as they are not necessary to effect the reaction and may lead to the formation of undesirable materials such as heavy polymerization products, carbon or the like.

It is not essential that the paraffin hydrocarbon be passed through the entire reaction zone in admixture with the paraffinic carbon chloride. In fact, where temperature and time factors employed to decompose the carbon chloride are such as may cause substantial decomposition of the paraffin hydrocarbon, it is desirable not to subject the paraffin hydrocarbon to such conditions. Under these conditions, the paraffinic carbon chloride alone may be subjected to decomposition and the paraffin hydrocarbon injected into the decomposition products after the latter have been cooled to a temperature to which the paraffin hydrocarbons may be subjected without danger of decomposition but above that at which any substantial recombining of the free chlorine with the products of decomposition occur.

In that aspect of my invention where the manufacture of an olefinic carbon chloride such as tetrachloroethylene is the primary purpose of the process, the alkyl halides and the hydrogen chloride constitute valuable by-products. In the further aspect of my invention where the desired product is the alkyl halide or alkylene dihalides, the tetrachloroethylene or the like may constitute a by-product of the process or may be rechlorinated by treatment with chlorine and recycled to the reaction zone to effect the production of further alkyl halides or alkylene di-halides. In this type of operation the paraffinic carbon chloride requirement is substantially completely supplied by the reconversion of the tetrachloroethylene or the like, only sufficient additional paraffinic carbon chloride being required to make up for unavoidable operating losses.

This latter aspect of my invention provides a novel method of effecting and controlling the chlorination of paraffinic hydrocarbons. Conventional methods for the chlorination of methane, for example, are difficult to control and frequently result in explosions. Also, it is difficult to avoid the formation of more highly chlorinated products when methyl chloride is desired. By my process the extent of chlorination of the methane is readily controllable by regulating the molecular ratio of methane and hexachloroethane or the like charged to the process as previously described.

The following specific examples will serve further to illustrate my improved process:

Example I

A mixture consisting of approximately 0.19 mole of hexachloroethane and a somewhat greater molar proportion of propane was passed through a reaction chamber consisting of an unpacked silica tube and therein heated to a temperature of about 420° C. to 430° C. The composite reaction products were passed from the reaction chamber through a cooler and tetrachloroethylene was separated therefrom by condensation. These reaction products were found to contain 0.196 mole of hydrochloric acid, which indicates that for each mole of hexachloroethane charged to the reaction, approximately one mole of chlorine was formed which reacted with the propane to form one mole of alkyl halide and one mole of hydrogen chloride.

Example II

Hexachloroethane was heated to a temperature of 150 to 155° C. and a stream of propane passed therethrough to form a mixture consisting of propane and hexachloroethane in molar proportions somewhat greater than unity. A quantity of this mixture containing 0.384 mole of hexachloroethane was passed through an unpacked silica tube of about 200 millimeters in length, heated to a temperature of about 440° C. The products of the reaction were passed from the exit end of this reaction tube through a condenser and the tetrachloroethylene formed by the reaction recovered therefrom by condensation. The residual material from this condensing operation was found to contain 0.3835 mole of hydrogen chloride which indicates that the hexachloroethane was substantially completely converted to tetrachloroethylene and chlorine, the latter reacting with the propylene to form alkyl halides and one mole of hydrogen chloride for each mole of hexachloroethane charged to the process.

The condensed tetrachloroethylene was found to contain only a minor amount of propyl chlorides and no carbon tetrachloride. The boiling point of normal propyl chloride is 46.4° C. and of isopropyl chloride is 36.5° C. The boiling point of carbon tetrachloride is 76.8° C. and the boiling point of tetrachloroethylene is 120.8° C. The major portion of the propyl chloride formed passed uncondensed from the condensing operation and the minor proportion contained in the tetrachloroethylene product was readily separated therefrom by distillation.

Example III

The tetrachloroethylene products obtained from several runs such as Examples I and II were combined, washed, dried and separated into three fractions by distillation and condensation at atmospheric pressure. The boiling ranges, proportions by volume and the optical characteristics of these fractions were as follows:

| Fraction No. | Boiling Range, °C. | Volume, percent | Refractive Index $N_D^{25}$ |
|---|---|---|---|
| 1 | 36–40 | 5.3 | 1.3803 |
| 2 | 40–100 | 7.0 | |
| 3 | 116–118 | 87.7 | 1.5025 |

Since the refractive indices of isopropyl chloride and normal propyl chloride are, respectively, 1.3811 and 1.3885, the refractive index of fraction #1 above indicates that the propyl chloride contained in the composite sample was primarily isopropyl chloride. Sample #3 consisted of substantially pure tetrachloroethylene as indicated by the above values, the pure tetrachloroethylene having a boiling point of 120.8° C. at 760 millimeters and a refractive index, $N_D^{20}=1.5055$.

These examples are illustrative of the fact that by my improved process chlorine resulting from the decomposition of the hexachloroethane reacts substantially completely with the paraffin hydrocarbon and that the previously experienced reverse reaction occurring upon the cooling of the reaction products is substantially if not completely prevented.

While I have illustrated my invention with particular reference to an embodiment thereof wherein hexachloroethane is used, it will be understood that various equivalent materials which similarly decompose with the formation of chlorine when subjected to elevated temperatures may be employed. For instance, chlorinated hexachlorobutadiene decomposes in this way, yielding chlorine at a temperature of about 200° C. and may be used with advantage.

The pyrolysis of carbon tetrachloride is also contemplated by my invention though the temperature at which it decomposes is above that to which the paraffin hydrocarbons may be subjected without substantial decomposition. Carbon tetrachloride decomposes at a temperature of 1300–1400° C. with formation of chlorine and tetrachloroethylene, according to the following Equation 5:

(5) 

$$2CCl_4 \rightarrow 2Cl_2 + C_2Cl_4$$

The recombining of the chlorine upon cooling of the decomposition products may be prevented by effecting the pyrolysis in the presence of paraffinic hydrocarbons. However, under such conditions, considerable decomposition of the paraffinic hydrocarbon or of the alkyl chlorides will result. Though tetrachloroethylene may be produced by this method, it is preferred first to decompose the carbon tetrachloride and to cool the products of decomposition to a temperature of about 400° C. to 500° C., prior to the addition of the paraffin hydrocarbon.

The invention also contemplates the pyrolysis of material such as octachloropropane which decompose upon heating to carbon tetrachloride and an olefinic carbon chloride such as tetrachloroethylene. In the use of such materials the octachloropropane, for example, may be pyrolyzed at a temperature of about 300° C. prior to admixture with the paraffin hydrocarbon and the products of the decomposition then subjected to a temperature of 1300° C. to 1400° C. to decompose the carbon tetrachloride or, if desired, the pyrolysis of the octachloropropane may be effected directly at the higher temperature. In either case, the products of the decomposition are cooled to a temperature of about 400° C. to 500° C., which is above that at which the chlorine recombines, before adding the paraffin hydrocarbon. Thereafter, the mixture is further cooled for the recovery of the various products as previously described.

I claim:

1. In the pyrolysis of carbon chlorides which normally decompose to yield a mixture containing free chlorine which upon cooling of the mixture recombines with other products of the decomposition, the improvement which comprises admixing a paraffin hydrocarbon with the products of the decomposition prior to cooling of the mixture to a temperature at which said recombining of the chlorine occurs.

2. In the pyrolysis of paraffinic carbon chlorides which normally decompose to yield a mixture containing free chlorine which upon cooling of the mixture recombines with other products of the decomposition, the improvement which comprises effecting the pyrolysis in the presence of a paraffin hydrocarbon.

3. In the pyrolysis of paraffinic carbon chlorides which normally decompose to yield a mixture containing free chlorine which upon cooling of the mixture recombines with other products of the decomposition, the improvement which comprises effecting the pyrolysis in the presence of a paraffin hydrocarbon containing not more than four carbon atoms per molecule.

4. In the pyrolysis of hexachloroethane for the production of tetrachloroethylene, the improvement which comprises effecting the pyrolysis in the presence of a paraffin hydrocarbon containing not more than four carbon atoms per molecule.

5. In the pyrolysis of hexachloroethane for the production of tetrachloroethylene, the improvement which comprises effecting the pyrolysis at a temperature within the range of about 300° C. to about 500° C. in the presence of a paraffin hydrocarbon containing not more than four carbon atoms per molecule.

6. A process of producing olefinic carbon chloride and alkyl chlorides which comprises subjecting a carbon chloride to pyrolysis and admixing a paraffin hydrocarbon with the admixed products of the decomposition prior to the cooling of said products to a temperature at which chlorine resulting from the decomposition recombines with other decomposition products.

7. A process for producing tetrachloroethylene and alkyl chlorides which comprises subjecting hexachloroethane to pyrolysis at a temperature within the range of about 300° C. to about 500° C. and reacting a paraffin hydrocarbon containing not more than four carbon atoms per molecule with the chlorine in the admixed products resulting from the decomposition prior to the cooling of said products to a temperature at which the chlorine reacts with other decomposition products of the mixture, the molar ratio of the paraffin hydrocarbon to the hexachloroethane being not less than 1:1.

8. A process of chlorinating paraffin hydrocarbons containing not more than four carbon atoms per molecule which comprises decomposing a carbon chloride by pyrolysis in a zone of decomposition, reacting the paraffin hydrocarbon to be chlorinated with the chlorine in the admixed products resulting from the decomposition prior to the cooling of said products to a temperature at which the chlorine reacts with other decomposition products of the mixture, separating olefinic carbon chloride which is formed by the pyrolysis from the reaction products including the chlorinated paraffin hydrocarbon, rechlorinating the olefinic carbon chloride thus separated and recycling the rechlorinated olefinic carbon chloride to the zone of decomposition.

9. A process of chlorinating paraffin hydrocarbons containing not more than four carbon atoms per molecule which comprises heating an admixture of hexachloroethane and the paraffin hydrocarbon to be chlorinated in a reaction zone to a temperature within the range of about 300° C. to about 500° C., separating tetrachloroethylene which is formed by the reaction from the reaction products including the alkyl chlorides formed, rechlorinating the tetrachloroethylene thus separated to hexachloroethane and returning the reformed hexachloroethane to the reaction zone.

CLIFFORD ALLEN HAMPEL.

REFERENCES CITED

The following references are of record in the file of this patent:

UNITED STATES PATENTS

| Number | Name | Date |
|---|---|---|
| 2,178,622 | Basel et al. | Nov. 7, 1939 |

Certificate of Correction

Patent No. 2,447,410.  August 17, 1948.

CLIFFORD ALLEN HAMPEL

It is hereby certified that errors appear in the printed specification of the above numbered patent requiring correction as follows: Column 1, line 43, for the equation reading $C_2Cl_6 \quad C_2Cl_4+Cl_2$ read $C_2Cl_6 \rightleftarrows C_2Cl_4+Cl_2$ column 6, line 53, after the word "employed" insert a period; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*